(12) United States Patent
Clare

(10) Patent No.: US 9,074,714 B2
(45) Date of Patent: Jul. 7, 2015

(54) PORTABLE INTEGRAL FITTED PLASTIC PIPE METHOD

(71) Applicant: James Carter Clare, Escalon, CA (US)

(72) Inventor: James Carter Clare, Escalon, CA (US)

(*) Notice: Subject to any disclaimer, the term of this patent is extended or adjusted under 35 U.S.C. 154(b) by 0 days.

(21) Appl. No.: 14/170,435

(22) Filed: Jan. 31, 2014

(65) Prior Publication Data

US 2014/0144007 A1 May 29, 2014

Related U.S. Application Data

(62) Division of application No. 12/396,310, filed on Mar. 2, 2009, now abandoned.

(60) Provisional application No. 61/093,929, filed on Sep. 3, 2008, provisional application No. 61/032,560, filed on Feb. 29, 2008.

(51) Int. Cl.
*B21K 1/76* (2006.01)
*F16L 55/00* (2006.01)
*F16L 47/08* (2006.01)
*F16L 47/12* (2006.01)

(52) U.S. Cl.
CPC .............. *F16L 55/00* (2013.01); *Y10T 29/4997* (2015.01); *Y10T 29/49428* (2015.01); *Y10T 29/4943* (2015.01); *F16L 47/08* (2013.01); *F16L 47/12* (2013.01)

(58) Field of Classification Search
CPC ........... F16L 55/00; F16L 47/08; F16L 47/12; Y10T 29/4943; Y10T 29/49428; Y10T 29/4997
USPC ........ 29/890.14, 890.141, 890.144, 464, 466, 29/468, 521, 525.01, 525.02, 525.04, 29/525.15; 285/239, 330, 349
See application file for complete search history.

(56) References Cited

U.S. PATENT DOCUMENTS

| | | | |
|---|---|---|---|
| 3,606,402 A * | 9/1971 | Medney | 285/305 |
| 3,625,551 A | 12/1971 | Branton et al. | |
| 4,152,821 A | 5/1979 | Scott | |
| 4,378,057 A | 3/1983 | O'Connell | |
| 5,511,826 A | 4/1996 | Clare et al. | |
| 5,529,348 A * | 6/1996 | Wasserman et al. | 285/288.6 |
| 5,868,443 A | 2/1999 | Ungerman et al. | |
| 6,179,347 B1 | 1/2001 | Dole et al. | |
| 6,352,288 B1 | 3/2002 | Calkins | |
| 6,561,731 B1 | 5/2003 | Clare | |
| 6,913,293 B1 | 7/2005 | Filer | |
| 7,011,345 B2 | 3/2006 | Foos | |
| 2001/0040376 A1 | 11/2001 | Metcalfe et al. | |

FOREIGN PATENT DOCUMENTS

WO WO-95/33948 12/1995
WO WO-97/08426 3/1997

* cited by examiner

*Primary Examiner* — Ryan J Walters
(74) *Attorney, Agent, or Firm* — Michael A. Glenn; Perkins Coie LLP

(57) ABSTRACT

A method for producing a detachable portable plastic pipe assembly comprises a molded coupling fused to pipes with a gasket inserted in between the pipes to form a seal. A spline is inserted into an aperture formed by the molded coupling to create a lock. The spline is mechanically attached or fused to the coupling. The assembly is attached to a water source for water transport. The gasket for forming a seal comprises an inside lip, an outside lip, and a nipple. The inside lip is composed of a softer material than the outside lip, and extends slightly beyond the length of the outside lip.

1 Claim, 5 Drawing Sheets

PORTABLE INTEGRAL FITTED PLASTIC PIPE METHOD

CROSS-REFERENCE TO RELATED APPLICATIONS

This patent application is a divisional patent application of U.S. patent application Ser. No. 12/396,310, filed Mar. 2, 2009, which application claims the benefit of provisional application Ser. No. 61/032,560, titled "Integral Fitted Portable Pipe," filed on Feb. 29, 2008 and provisional patent application Ser. No. 61/093,929, titled "Gasket for Integral Fitted Portable Pipes," filed on Sep. 3, 2008, the entirety of each of which is incorporated herein by this reference thereto.

FIELD OF THE INVENTION

This invention pertains generally to a portable pipe assembly for irrigation and water transport, and more specifically a portable pipe assembly that includes a spline and gasket for both locking and sealing and a molded coupling that is fused to the pipes for rapid assembly, disassembly, and transportation of temporary pipelines.

BACKGROUND

Portable pipes are commonly used for irrigation and to transport water where a temporary pipeline is sufficient for a short-time need. As water becomes a scarce commodity, particularly in dry, agricultural areas such as California, irrigation sprinklers and drip irrigation systems are essential to conserve water and produce crops on rapidly diminishing farmland. Temporary water systems are also commonly used to control dust on construction sites, fight fires, or provide water during emergencies.

Irrigation systems can be permanent, semi-portable, or fully portable. Permanent irrigation systems are typically composed of metal and plastics, and the parts are generally fused together to prevent water leakage. Fully portable systems are easily assembled and disassembled. Portable systems therefore require lightweight equipment such as aluminum or polyvinyl chloride (PVC) pipes in relatively short sections. The systems include a multiplicity of gaskets and other water-tight seals so as to build sufficient water pressure to expel water through sprinkler heads or drip irrigation equipment.

Portable pipe systems frequently suffer from water leakage, corrosion, and are cumbersome to install because of all the coupling locations and variable components. At the very least, each system contains a series of pipes coupled to a main system: some supplying the water to sprinkler heads or drip irrigation equipment and other portable pipe systems simply used for water transport fitted to the pipes.

FIG. 1 (prior art) is from U.S. Pat. No. 5,511,826, and illustrates a sprinkler fitting 100 that is coupled to irrigation pipes (not shown). The sprinkler riser orifice 105 contains threads 110 for screwing the sprinkler head into the sprinkler fitting 100. A flexible polymeric spline 115 is inserted in each through-hole 120 between irrigation pipes and the tubular fitting member 125 to form two mechanical latches. This portable pipe coupling, which is used to join two separate pipes, is slow and cumbersome to install and requires several parts to complete a pipe line. This coupling is a recent modification for PVC pipe.

Connections for aluminum and steel pipes in portable systems also include gaskets and a locking device. FIG. 2 (prior art) is an example of an aluminum fitting 127 pressed or welded to the aluminum pipe with a latching mechanism 130. FIG. 3 (prior art) is an example of a galvanized fitting 135 pressed into an aluminum pipe with a locking mechanism 140. FIG. 4 (prior art) is an example of a joint assembly with a detachable coupler 145 that is coupled to the pipe 147 by inserting a spline 150 into the insertion hole 152 in the coupler 145.

Current technology for PVC systems use loose couplers. FIG. 5 (prior art) is an example of a loose coupler 155 for connecting two pipes 157. FIG. 6 (prior art) is another example of a loose coupler 160 with two insertion holes 162 for splines.

SUMMARY OF THE INVENTION

In one embodiment, a portable pipe assembly comprises pipes coupled to each other, each pipe having a male end (stab) and a female end (coupling), each coupling having a locking device (spline) and an annular gasket to form a seal. The molded coupling surrounds the stab end of the pipe and a locking mechanism is incorporated between the coupling and another pipe. The locking mechanism can be either a spline or a gasket having a hook mechanism. At one end, a molded coupling comprises a groove for receiving the annular gasket and another groove for receiving the locking mechanism. The pipes are composed of a fusible material such as polyethylene.

The features and advantages described in this summary and in the following detailed description are not all-inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict embodiments of the present invention for purposes of illustration only. One skilled in the art will readily recognize from the following discussion that alternative embodiments of the structures illustrated herein may be employed without departing from the principles of the invention detailed herein.

DETAILED DESCRIPTION

Figure 1:
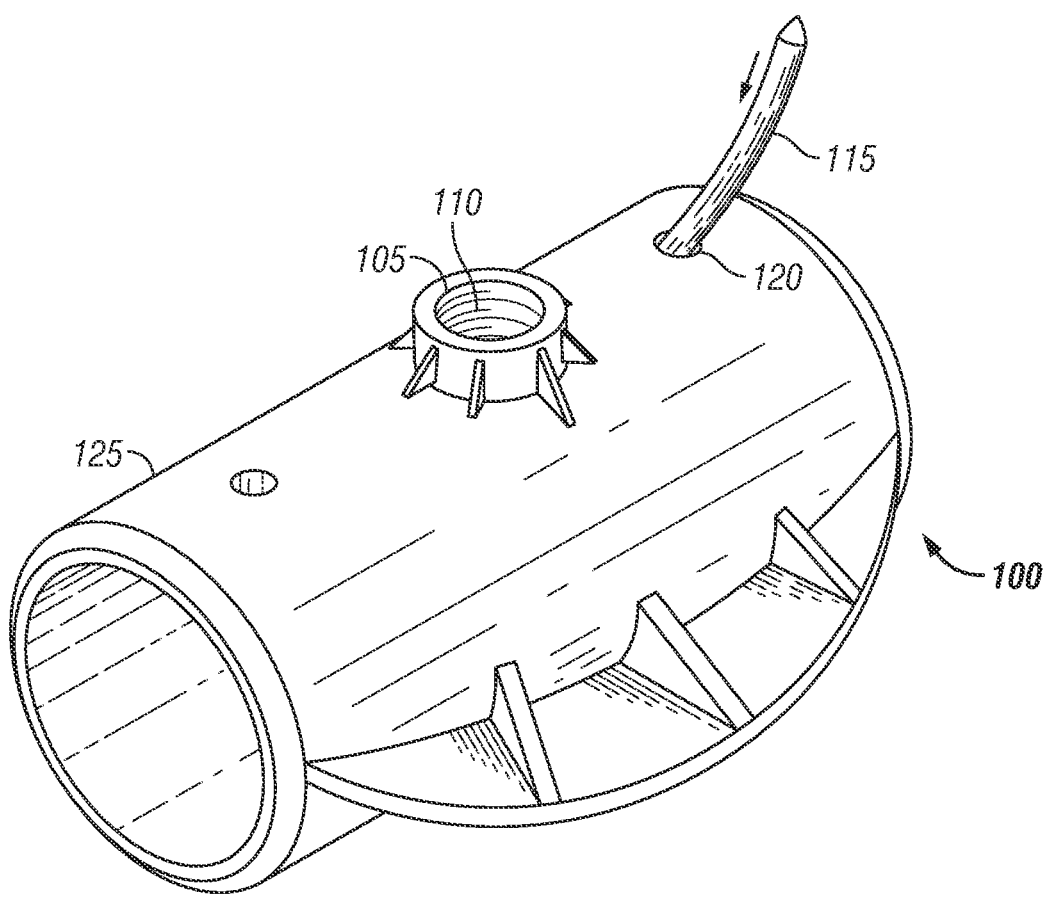
FIGS. 1-6 are prior art front perspectives of various pipe assemblies.
Figure 2:
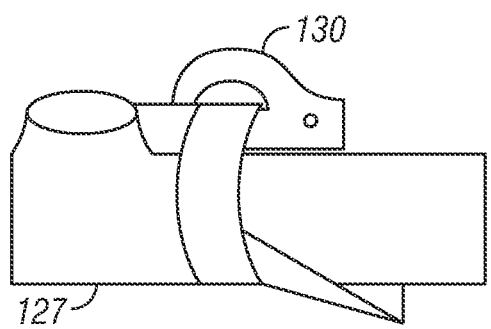
Figure 3:
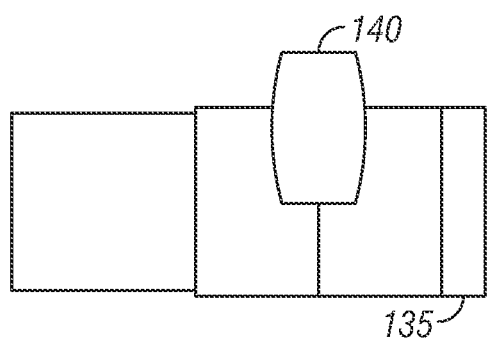
Figure 4:
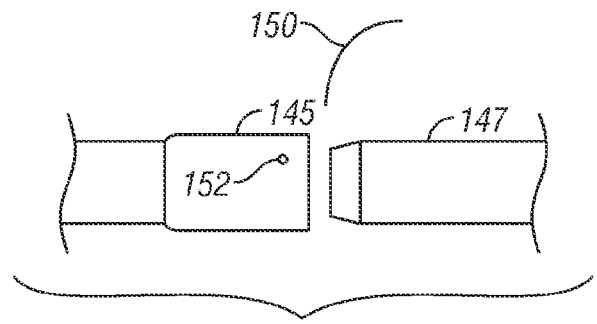
Figure 5:
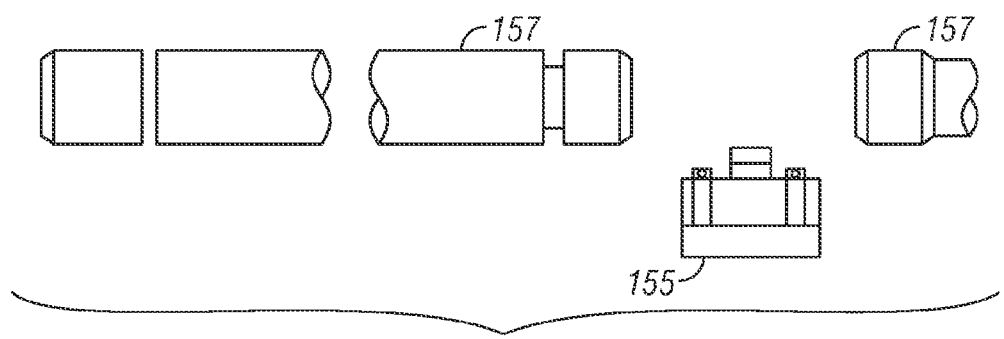
Figure 6:
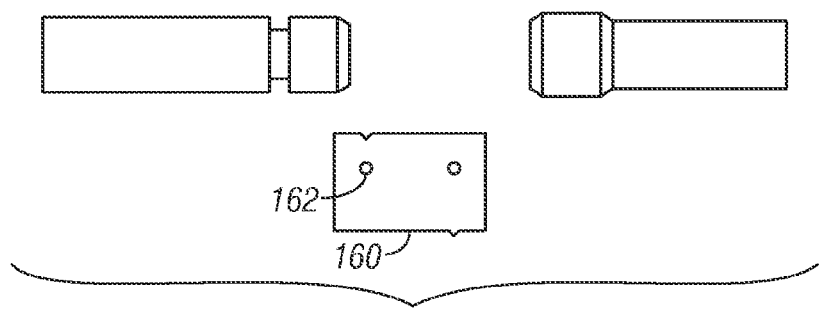
Figure 7:
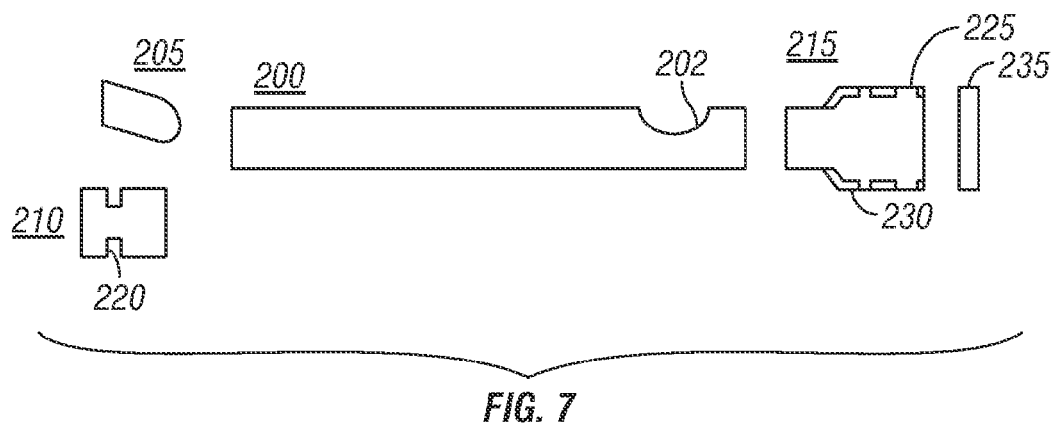
FIG. 7 is a front perspective view of a portable pipe assembly, according to one embodiment of the present invention.

FIG. 7 illustrates a portable pipe assembly that includes a pipe 200, a stab end 210, an annular gasket 235, and a molded coupling 215, according to one embodiment of the invention.

In one embodiment, the pipe 200 is composed of a fusible plastic material such as polyethylene. In other embodiments, the pipe 200 is composed of any other lightweight material, such as aluminum, PVC, polypropylene, etc. Many other examples of lightweight fusible construction materials for pipes are known to those of ordinary skill in the relevant art, and their use within the context of the present invention will be readily apparent to one of such a skill level in light of this specification. The pipe wall can be of any thickness. The irrigation pipe 200 can provide an aperture 202 for coupling to a sprinkler head or valve.

In one embodiment, a sleeve 205 is pressed into one end of the pipe 200 to maintain roundness. The sleeve 205 comprises a male end that mates with the inner diameter of the irrigation pipe 200. In another embodiment, a molded stab 210 that matches the outer diameter of the pipe is fused to the pipe 200 using glue, heat, etc. in order to provide a durable, hard end that resists damage and maintains roundness. The stab 210 contains a groove 220 that is aligned with a first groove 225 in the molded coupling 215. This irrigation pipe 200 is positioned at the end of the irrigation pipe assembly.

The molded coupling 215 is a female coupler that receives either the stab 210 fused with the pipe 200 or mates directly with the outer diameter of the pipe 200. In one embodiment, the molded coupling 215 is made of the same fusible material as the pipe 200. Many other examples of construction materials for molded couplings are known to those of ordinary skill in the relevant art, and their use within the context of the present invention will be readily apparent to one of such a skill level in light of this specification. The molded coupling 215 has a first groove 225 for insertion of the spline 400 and a second groove 230 for insertion of the annular gasket 235.

FIG. 7 illustrates an aperture 202 in the pipe 200 where an outlet or valve can be fused according to one embodiment of the invention. For example, a polyethylene branch saddle is sized to fuse to the outer diameter of the pipe. A person of ordinary skill in the art will understand in light of this specification that different types of valves can be affixed in different types of ways, as long as a proper seal is formed and water does not leak from the seal.

Figure 8:
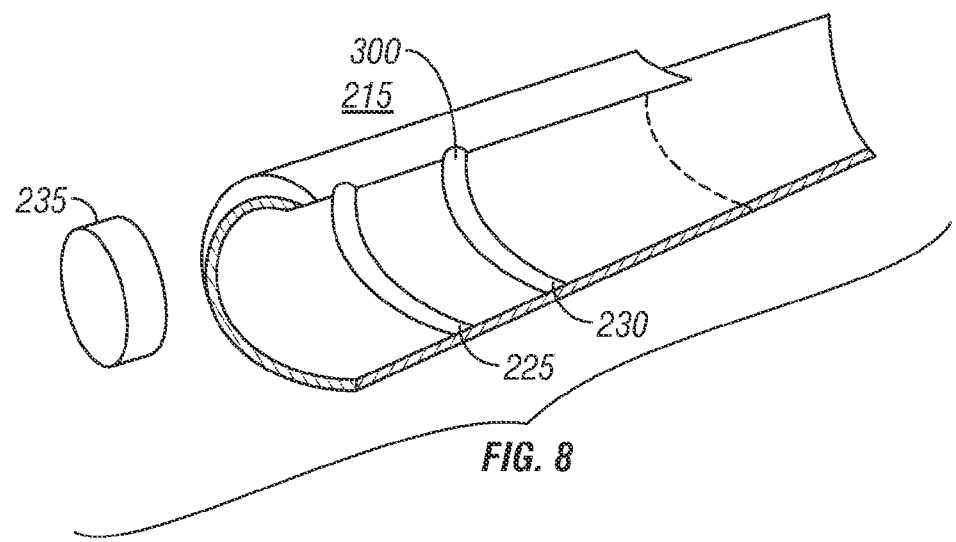
FIG. 8 is a cross-sectional front perspective view of a molded coupling and an annular gasket, according to one embodiment of the present invention.

FIG. 8 illustrates the inside of the molded coupling 215 and a side view of the annular gasket 235 that is inserted inside the second groove 230 according to one embodiment of the invention. The stab end 210 is inserted into the molded coupling 215 until it seals with the annular gasket 235. The opposite side of the molded coupling 215 is the same diameter as the pipe 200 to which it is fused. A spline and annular gasket are inserted between the pipe 200 and the molded coupling 215 to form a lock and seal. When the stab 210 is inserted into the coupling, the locking grooves align and the annular gasket 235 is seated on the smooth surface of the stab 210 end or pipe 200.

In one embodiment, the gasket is made of rubber and comprises multiple lips for forming a seal. The diameter, style, and thickness of the gasket 235 are modified according to the size of the pipe 200 and the coupling 215.

Figure 9:
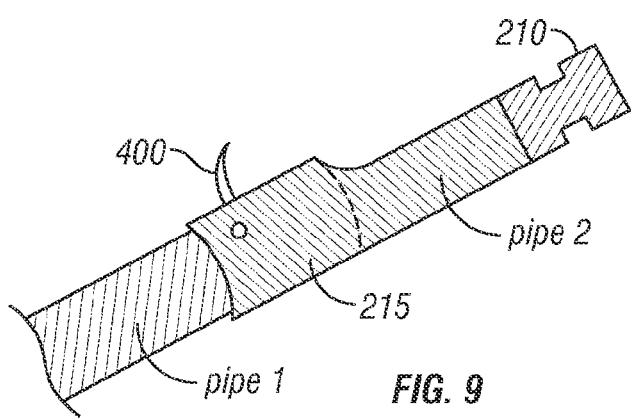
FIG. 9 is a partial perspective, cross-sectional view of a molded coupling, an irrigation pipe, an annular gasket, and a spline, according to one of the embodiments of the invention.

FIG. 9 illustrates the molded coupling 215 coupled to the stab 210 end of a first pipe 200 (pipe #1) with a spline 400 inserted between the first pipe and the molded coupling 215 to form a lock according to one embodiment of the invention. An annular gasket 235 is placed in a second groove 230 of the molded coupling 215 to provide a seal. As shown in FIG. 9, the molded coupling is fused to an end of a second pipe (pipe 2).

The spline comprises a flat piece or knob and a cord made of flexible material such as polyethylene, polypropylene, polystyrene, PVC, nylon, polyamide, etc. The cord portion of the spline 400 is inserted in the first groove 225 of the molded coupling 215. The spline 400 is threaded through an aperture 300 in the molded coupling 215. The flat part of the spline is either fused or mechanically attached to the coupling. One function of the flat piece is to prevent the entire spline 400 from being pulled though the aperture 300 in the molded coupling 215. The cord portion of the spline 400 provides the lock.

Gasket

Figure 10A:
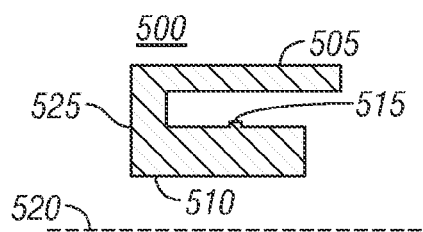
FIG. 10A is a front perspective view of a gasket, according to one embodiment of the invention.

FIG. 10A illustrates a specialized gasket 500 used to establish a sealing mechanism, according to one embodiment of the invention. Gaskets tend to leak at low pressure, particularly when the entire gasket is made of the same material or similar materials. In one embodiment, the gasket 500 can be composed of two separate materials. The inside lip 505 is composed of a soft material, e.g., Neoprene®, spandex, nylon, etc. The outside lip 510 can be composed of a harder material, e.g., rubber.

In one embodiment, the same material is used for both the inside lip 505 and the outside lip 510, but each section is processed according to different techniques to elicit different chemical properties. For example, the gasket 500 can be entirely composed of rubber, but the inside part can undergo vulcanization, i.e., be heated and chemically combined with sulfur to soften the rubber. In one embodiment, the inside lip 505 extends beyond the length of the outside lip 510.

The gasket 500 in FIG. 10A is positioned along a longitudinal axis 520. The gasket 500 comprises a substantially rectangular inside lip 505 that is parallel to the longitudinal axis 520. In other embodiments, the inside lip 505 is another shape that allows a user to grasp the lip, e.g. cylindrical, barbed, square, etc. The outside lip 510 is parallel to the inside lip 505, which extends beyond the length of the outside lip 510.

Figure 10B:
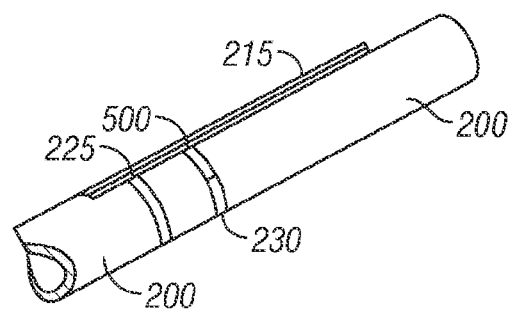
FIG. 10B is a partial perspective, cross-sectional view of a portable pipe, molded coupling, and gasket, according to one of the embodiments of the invention.

A sidewall 525 connects the outside lip 510 and the inside lip 505. The sidewall 525 secures the gasket 500 in a fixed position when the outside lip 510 is inserted into the aperture, until it is fully seated around the entire circumference thereof. The outside lip 510 is aligned with the second groove 230 in the molded coupling 215 for added stability. FIG. 10B shows the gasket 500 inserted through the aperture 300 in the molded coupling to create a seal between the molded coupling 215 and the stab 210 or pipe 200. From this perspective, only the inside lip 505 is visible.

The outside lip 510 of the gasket 500 contains a deformable nipple 515, which provides additional compression for the seal, which is accomplished primarily by the inside lip 505. The nipple 515 is typically composed of the same material as the bottom lip 510.

In one embodiment, the inside lip 505 of the gasket is 1.10 inches, the outside lip 510 is 100 inches, and the nipple 515 on the bottom lip 510 is ¼ inches high and ¼ inches wide. These measurements are not required to practice the invention, but rather, serve as a guide as to how one skilled in the art might practice the invention. Other measurements are possible, and the use thereof within the context of the specification.

Figure 11:
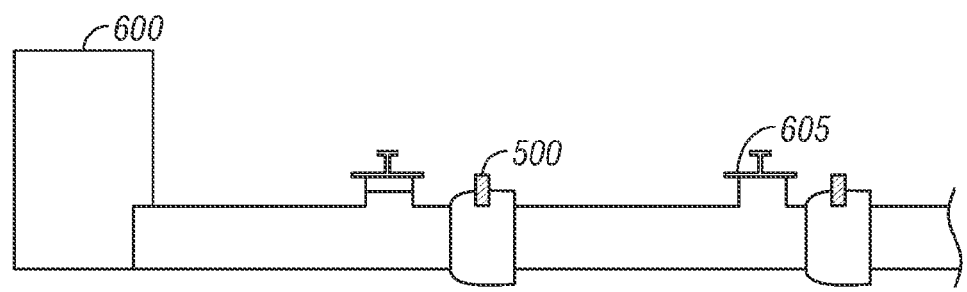
FIG. 11 is a front perspective view of an assembled irrigation system, according to one of the embodiments of the invention.

FIG. 11 shows a pipe assembly that uses the specialized gasket 500 to form the seal between the portable pipe from FIG. 7 and another portable pipe from FIG. 7 according to one embodiment of the invention. The portable pipes from FIG. 7 are connected until the assembly is long enough to provide water to the required area. The first portable pipe in the chain is attached to a water source 600. Water is pumped into the pipe assembly at sufficient pressure to transport water through the pipeline or valve 605.

As will be understood by those familiar with the art, the invention may be embodied in other specific forms without departing from the spirit or essential characteristics thereof. Likewise, the particular naming and division of the members, features, attributes, and other aspects are not mandatory or significant, and the mechanisms that implement the invention or its features may have different names, divisions and/or formats. Accordingly, the disclosure of the present invention is intended to be illustrative, but not limiting, of the scope of the invention, which is set forth in the following claims.

The invention claimed is:

1. A method for assembling detachable pipes, the method comprising:
   fusing, with heat or glue, a first end of a stab to a first end of a first pipe, said first pipe made of a fusible plastic material;
   inserting a gasket into a second groove in first end of a molded coupling;
   inserting a second end of said stab that is fused to said first pipe into said molded coupling until said stab abuts a first groove in said molded coupling, said gasket forming a seal between said coupling and said stab that is fused to said first pipe;
   aligning a groove in said stab with said first groove in said molded coupling;
   inserting a locking mechanism comprising a spline into an aperture formed in said molded coupling to create a secure lock between said molded coupling and said stab that is fused to said first pipe; and
   fusing, with heat or glue, a second pipe to a second end of said molded coupling, said second pipe made of a fusible plastic material.

* * * * *